Nov. 28, 1961  J. DELORME  3,010,472
FREE-PISTON GAS GENERATORS
Filed June 19, 1959  2 Sheets-Sheet 1

INVENTOR:
Jean Delorme
by Michael S. Strike
Attorney

Nov. 28, 1961  J. DELORME  3,010,472
FREE-PISTON GAS GENERATORS
Filed June 19, 1959  2 Sheets-Sheet 2
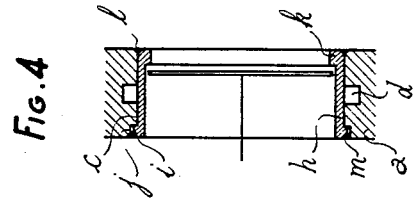
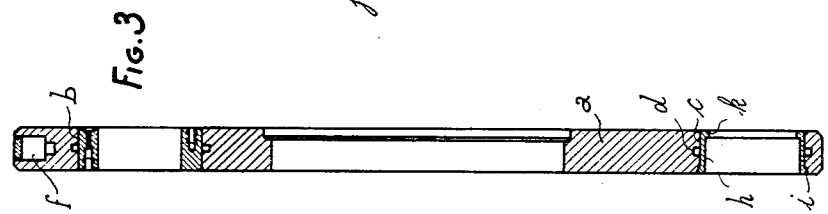
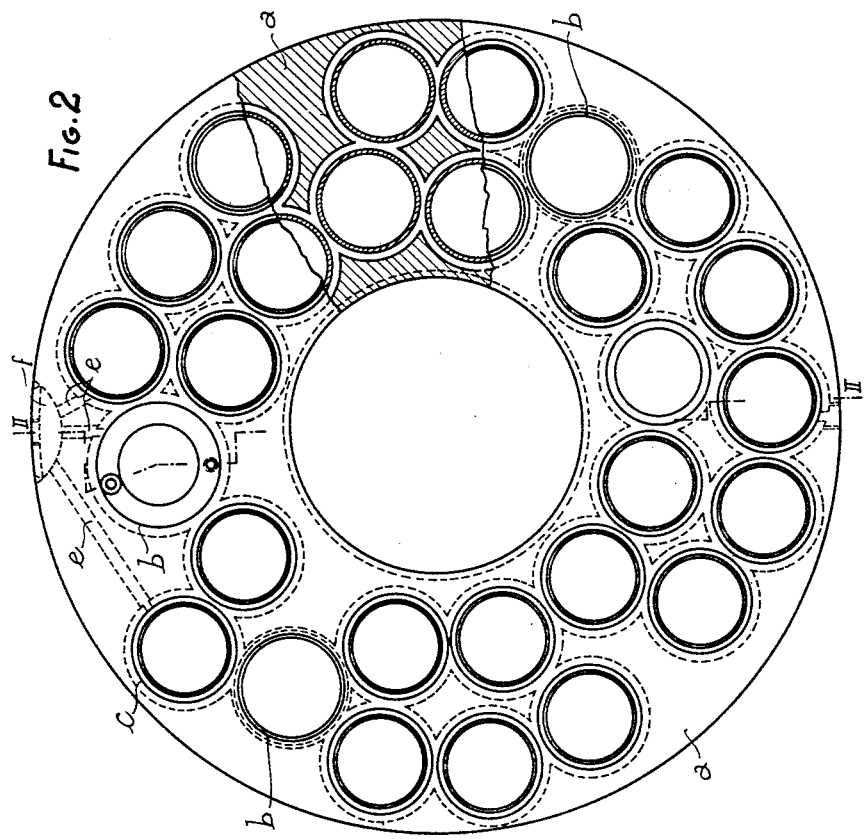
INVENTOR:
Jean Delorme
by Michael S. Striker
Attorney United States Patent Office 3,010,472
Patented Nov. 28, 1961

3,010,472
FREE-PISTON GAS GENERATORS
Jean Delorme, St. Chamond, France, assignor to Compagnie des Ateliers et Forges de la Loire (St. Chamond, Firminy, St. Etienne, Jacob-Holtzer), Paris, France, a corporation of France
Filed June 19, 1959, Ser. No. 821,599
Claims priority, application France June 30, 1958
10 Claims. (Cl. 137—340)

This invention relates to free-piston gas generators, which are coming into ever wider use in many spheres, such as the production of electrical energy, traction on railways and the propulsion of ships.

These generators are constituted essentially by a cylindrical jacket or casing, in the centre of which there is situated a working cylinder; two opposed motor pistons reciprocate in this cylinder, each connected directly to one of two compressor pistons working in the opposite ends of the casing.

Between the two compressor pistons, there are secured transversely in the jacket or casing, two carrier plates supporting valves which control the passage of air delivered by the compressor pistons to the admission ports of the working cylinder.

In the known gas generators of this kind, each of the valve-carrier plates is constituted, in order to permit cooling by water circulation, by a basin obtained by turning from a thick metal sheet. This basin is closed by a lid welded to it over its entire periphery.

The double-walled jacket thus constituted is pierced, on its faces, with a large number of holes for housing tubes which are welded to the basin and the lid by thick weld seams. Some of these holes are intended for piston guide rods, while the others, the greater number, are intended to receive the delivery valves.

Under the effect of thermal contraction of all the weld seams, the whole of the valve carrier is subjected to severe constriction, in the course of construction, which occasions enormous stresses, with consequential creation of fissures which often cannot be traced in the pressure test, to which the carrier is subjected in the unmachined state.

The valve carrier is then machined externally, and each hole for a valve housing is machined again to bring it to the desired shape and dimensions. During this machining, the thicknesses of the tubes and the volumes of the weld seams are greatly reduced, not always symmetrically, by reason of the considerable contraction discussed above.

A fresh pressure test in the finished state very often discloses leakages in the weld seams, necessitating delicate and onerous repairs.

When equipped with its valves and mounted in place on the gas generator, the valve carrier plate is subjected to bending in alternate directions, under the shock of the simultaneous closure of all the valves at a frequency which may be about 600 times per minute.

At this speed of continuous operation, it is observed that the valve-carriers very quickly lose their tightness, doubtless due to the presence of micro-fissures in the weld seams.

The present invention has for its main object an improved construction of valve-carrier plate which is free from these disadvantages.

In accordance with the invention, the valve-carrier is constituted by a solid plate having a thickness preferably equal to the total depth of a valve, in which plate there are bored, with precision, the housings for the piston guide and the valves. Around these housings there are formed, at the middle of the thickness of the plate, circular grooves which intersect one another and also communicate with the entry and exit for the cooling water. Tubes forming a piston guide and valve cages are fitted by force into these housings, so that the connected grooves form an enclosure in which the cooling water circulates.

The invention is described hereinafter, in an embodiment given only by way of example, having no limitative character, since the invention can be carried out in accordance with other forms, arrangements and proportions, without departing from its scope as defined in the appended claims.

In the accompanying drawing, to which reference is made in the description,

FIG. 2 shows a front view of a valve-carrier plate embodying the invention, one part being in section.

FIG. 3 is a section along the line III—III of FIG. 1, and

FIG. 4 is a detail section of the plate, on a larger scale, taken along the axis of a delivery valve.

Figure 1:
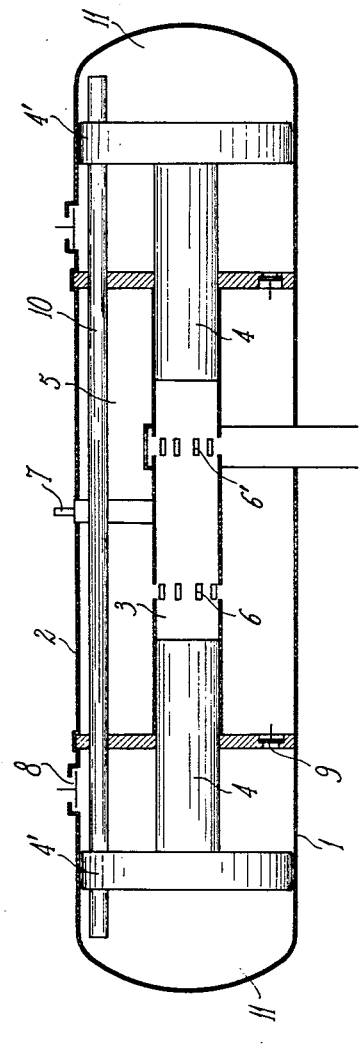
FIG. 1 represents diagrammatically a free-piston gas generator of the kind to which the invention relates.

As shown in FIG. 1, the free-piston gas generator comprises a cylindrical jacket 1 with domed ends; the middle portion 2 of this jacket forms a motor casing, in the centre of which there is disposed a working cylinder 3. Two opposed motor pistons 4 reciprocate freely in this cylinder, each being secured directly to one of a pair of compressor pistons 4' working in the opposite ends of the jacket 1. The spaces defined between the internal faces of the compressor pistons 4' and the transverse walls of the motor casing 2 constitute two pumping cylinders, which deliver air into the main compressor cylinder 5. Scavenging and air admission ports 6 and exhaust ports 6' are arranged in the motor cylinder 3, to which fuel is introduced by injectors, represented diagrammatically at 7. Suction valves 8 open into the pumping cylinders, from which the air passes through delivery valves 9 into the cylinder 5.

The radial walls at the opposite ends of the motor casing 2 are constituted by plates serving as support for the delivery valves 9 and also for rods 10 guiding the motor pistons.

The generator operates in the following manner:

With both motor pistons 4 situated in the vicinity of the inner dead point, the air contained in the motor cylinder 3 is greatly compressed, and reaches a sufficient temperature for self-ignition and combustion of the fuel introduced through the injectors 7. The combustion causes an increase of pressure, under the effect of which the two pistons are projected towards the ends of the generator.

During this outward stroke, the suction valves 8 open, the compressor cylinders fill with fresh air, and the delivery valves 9 close, while the pistons successively clear the exhaust ports 6' and the scavenging and air admission ports 6.

However, in their progress towards the ends of the generator, the pistons 4' compress the air contained in the spaces 11, which act as pneumatic accumulators. When the pistons have reached their outer dead point, they are driven back, by the air compressed in these accumulators, towards the centre of the apparatus, thus carrying out their return stroke. In this stroke, the suction valves 8 close, the delivery valves 9 open, and fresh air is delivered into the motor cylinder. The motor pistons 4 first close air admission ports 6, and then the exhaust ports 6'. The air is compressed in the motor cylinder 3, and serves for combustion of a fresh injection of fuel.

As has been pointed out above, the transverse walls or partitions at the ends of the motor casing 2 and compressor cylinder 5 are constituted by plates serving as support for the delivery valves 9.

The present invention provides an improved valve-carrier plate for this purpose; as seen in FIGS. 2 and 3, the valve-carrier consists of a thick plate *a* in which a hole *b* is bored for the housing of the piston guide 10 (FIG. 1), and other holes *c* are bored for housing the delivery valve cages; circular groves *d* are formed around the holes *b* and *c*, at the middle of the thickness of the plate *a*. As may be seen from FIG. 2, all these grooves *d* intersect one another, and they are connected by channels *e* to a small chamber *f* into which cooling water is supplied.

At the bottom of the plate *a* they communicate with an outlet *g* for discharge of this water.

Valve cages *h*, force-driven or expanded in position in the holes *c*, present, as may be seen in FIGS. 3 and 4, shoulders *i* which fit grooves *j* of corresponding shape, formed in the plate *a*. This shoulder enables the tubular cage *h* to resist the shaking occasioned by the closing of the valve on its seating machined on the inturned flange *k* of the tube.

As additional safety measure, it is possible to provide two small weld seams *l* and *m* around the valve cage *h* which, in view of their small size, are unlikely to cause harmful deformations of the carrier plate.

Naturally the grooves *d* formed in the thickness of the plate *a* can have dimensions and proportions different from those indicated in the drawing.

What I claim is:

1. An arrangement of the character described comprising, in combination, a plate having opposite faces and being formed with a plurality of apertures extending between said opposite faces, each of said apertures having an inner annular face and being formed therein with an annular circumferential groove spaced from both of said opposite faces and of such a depth that grooves of adjacent apertures intersect and communicate with each other; means located in each aperture and engaging the inner annular face thereof without clearance so as to close the groove in the inner face of said aperture toward the interior of said aperture; and inlet and outlet means communicating with said intersecting grooves for passing a cooling fluid therethrough.

2. An arrangement of the character described comprising, in combination, a plate having opposite faces and being formed with a plurality of apertures extending between said opposite faces, each of said apertures having an inner annular face and being formed therein with an annular circumferential groove spaced from both of said opposite faces and of such a depth that grooves of adjacent apertures intersect and communicate with each other; a tubular member located in each aperture and engaging the inner annular face thereof without clearance so as to close the groove in the inner face of said aperture toward the interior of said aperture; and inlet and outlet means communicating with said intersecting grooves for passing a cooling fluid therethrough.

3. An arrangement of the character described comprising, in combination, a plate having opposite faces and being formed with a plurality of circular bores extending between said opposite faces, each of said circular bores having an inner annular face and being formed therein with an annular circumferential groove concentric with said bore and spaced from both of said opposite faces, the sum of radii of grooves in adjacent bores being greater than the center distance of said adjacent bores so that grooves of adjacent circular bores intersect and communicate with each other; a tubular member located in each bore and engaging the inner annular face thereof without clearance so as to close the groove in the inner face of said bore toward the interior of said bore; and inlet and outlet means communicating with said intersecting grooves for passing a cooling fluid therethrough.

4. An arrangement of the character described comprising, in combination, a plate having opposite faces and an edge face extending between said opposite faces, said plate being formed with a plurality of a apertures extending between said opposite faces, each of said apertures having an inner annular face and being formed therein with an annular circumferential groove spaced from both of said opposite faces and of such a depth that grooves of adjacent apertures intersect and communicate with each other; means located in each aperture and engaging the inner annular face thereof without clearance so as to close the groove in the inner face of said aperture toward the interior of said aperture; and inlet and outlet means extending respectively from different points of said edge face into said plate and communicating with said intersecting grooves for passing a cooling fluid therethrough.

5. An arrangement of the character described comprising, in combination, a plate having opposite faces and an edge face extending between said opposite faces, said plate being formed with a plurality of apertures extending between said opposite faces, each of said apertures having an inner annular face and being formed therein with an annular circumferential groove spaced from both of said opposite faces and of such a depth that grooves of adjacent apertures intersect and communicate with each other; means located in each aperture and engaging the inner annular face thereof without clearance so as to close the groove in the inner face of said aperture toward the interior of said aperture; and inlet and outlet means extending respectively from opposite points of said edge face into said plate and communicating with said intersecting grooves for passing a cooling fluid therethrough.

6. An arrangement of the character described comprising, in combination, a plate having opposite faces and being formed with a plurality of circular bores extending between said opposite faces and having parallel axes extending substantially normal to said opposite faces of said plate, each of said circular bores having an inner annular face and being formed therein with an annular circumferential groove concentric with said bore and spaced from both of said opposite faces, the sum of radii of grooves in adjacent bores being greater than the center distance of said adjacent bores so that grooves of adjacent circular bores intersect and communicate with each other; a tubular member located in each bore and engaging the inner annular face thereof without clearance so as to close the groove in the inner face of said bore toward the interior of said bore; and inlet and outlet means communicating with said intersecting grooves for passing a cooling fluid therethrough.

7. A plate structure of the character described for use with a free-piston gas generator comprising, in combination, a plate having opposite faces; a plurality of adjacent valve housings extending between said opposite faces transversely through said plate and being each surrounded by a circumferential groove closed by a wall portion of said valve housing toward the interior of said housing, said grooves having a depth so that grooves of adjacent valve housings intersect and communicate with each other; inlet and outlet means communicating with said intersecting grooves for passing a cooling fluid therethrough; and a plurality of valve means located respectively in said valve housings for controlling the flow of a fluid in transverse direction through said plate.

8. A plate structure of the character described for use with a free-piston gas generator comprising, in combination, a plate having opposite faces and being formed with a plurality of apertures extending between said opposite faces, each of said apertures having an inner annular face and being formed therein with an annular circumferential groove spaced from both of said opposite faces and of such a depth that grooves of adjacent apertures intersect and communicate with each other; a valve housing located in each aperture and having an outer annular face engaging the inner annular face of said aperture without clearance so as to close the groove in the inner face of the aperture toward the interior of said aperture; a valve member in each of said valve housings; and inlet and outlet means communicating with said intersecting grooves for passing a cooling fluid therethrough.

9. A plate structure of the character described for use with a free-piston gas generator comprising, in combination, a plate having opposite faces and being formed with a plurality of apertures extending between said opposite faces, each of said apertures having an inner annular face and being formed therein with an annular circumferential groove spaced from both of said opposite faces and of such a depth that grooves of adjacent apertures intersect and communicate with each other, each of said apertures being further formed at one of said opposite faces with an additional circumferential groove; a valve housing located in each aperture and having an outer annular face engaging the inner annular face of said aperture without clearance so as to close the groove in the inner face of the aperture toward the interior of said aperture, said valve housing having at one end thereof a peripheral flange located in said additional groove of the respective aperture; a valve member in each of said valve housings; and inlet means communicating with said intersecting grooves for passing a cooling fluid therethrough.

10. An arrangement of the character described comprising, in combination, a plate having opposite faces and being formed with a plurality of apertures extending between said opposite faces, each of said apertures having an inner annular face and being formed therein with an annular circumferential groove spaced from both of said opposite faces and of such a depth that grooves of adjacent apertures intersect and communicate with each other; a tubular member located in each aperture and engaging the inner annular face thereof without clearance so as to close the groove in the inner face of said aperture toward the interior of said aperture, said tubular member being welded at least at one end thereof to said plate so as to prevent displacement of said tubular member with respect to said plate; and inlet and outlet means communicating with said intersecting grooves for passing a cooling fluid therethrough.

References Cited in the file of this patent
UNITED STATES PATENTS

| | | |
|---|---|---|
| 267,234 | Long | Nov. 7, 1882 |
| 1,481,691 | Chew et al. | Jan. 22, 1924 |
| 2,204,724 | Cope | June 18, 1940 |
| 2,823,654 | Horgen | Feb. 18, 1958 |
| 2,830,565 | Beale et al. | Apr. 15, 1958 |